(12) United States Patent
Mesh

(10) Patent No.: US 6,256,431 B1
(45) Date of Patent: Jul. 3, 2001

(54) WDM MULTIPLEXER

(75) Inventor: Michael Mesh, Rehovot (IL)

(73) Assignee: ECI Telecom Ltd., Petach-Tikva (IL)

( * ) Notice: Subject to any disclaimer, the term of this patent is extended or adjusted under 35 U.S.C. 154(b) by 0 days.

(21) Appl. No.: 09/248,919

(22) Filed: Feb. 11, 1999

(51) Int. Cl.[7] .................................................. G02B 6/28
(52) U.S. Cl. .................................... 385/24; 385/15
(58) Field of Search ............................. 385/24, 15, 27, 385/28, 39, 42, 37, 17, 18; 359/127, 130, 122, 123, 156, 192

(56) References Cited

U.S. PATENT DOCUMENTS 5,657,406 * 8/1997 Ball .
5,841,557 * 11/1998 Otsuka et al. .

* cited by examiner

Primary Examiner—Frank G. Font
Assistant Examiner—Tu T. Nguyen
(74) Attorney, Agent, or Firm—Wolf, Greenfield & Sacks, P.C.

(57) ABSTRACT

An expandable multiplexer and method for adding additional channels per fiber in an optical communication system, the multiplexer including a wavelength multiplexer including at least two multiplexer input ports for combining a plurality of input wavelengths onto at least one multiplexer output port, and at least one wavelength filter including at least two filter input ports for combining at least two selected wavelengths onto at least one filter output port coupled to one of the multiplexer input ports.

16 Claims, 5 Drawing Sheets

S—SERVICES
Tr—TRANSMITTERS
F—WAVELENGTH FILTERS
R—RECEIVERS
$\lambda$—OPTICAL WAVELENGTH
WDM—WAVELENGTH
DIVISION
MULTIPLEXER/DEMULTIPLEXER

WDM MULTIPLEXER

FIELD OF THE INVENTION

The present invention relates to wavelength division multiplexers for optical communications systems in general and, in particular, to expandable WDM multiplexers for access networks.

BACKGROUND OF THE INVENTION

Optical communication systems, systems using optical signals to convey information across an optical waveguiding medium, are well known in communication systems. Such optical systems include, but are not limited to, telecommunications systems, cable television systems, and local area networks.

As the need for broadband communication services increased, it became necessary to increase the capacity of known waveguiding media. One solution is wavelength division multiplexing (WDM), which utilizes plural optical signal channels, each channel being assigned a particular channel wavelength. Signal channels are generated, multiplexed, transmitted over a single waveguide, and demultiplexed to individually route each channel wavelength to a designated receiver.

Conventional broadband systems can be configured in one of two ways. A general structure is set forth in FIG. 1. As can be seen, a typical system includes a plurality of narrow band tunable lasers, such as DBR lasers, located at the Central Office 1 where data, TV, voice signals, etc. are modulated onto a preassigned wavelength. The combined wavelengths are fed onto the feeder fiber 2. At the remote terminal, each wavelength is separated into the distribution fiber associated with that wavelength by a WDM demultiplexer element 3 and provided to the appropriate user. Conventional dense WDM multiplexers/demultiplexers support up to 20–30 wavelengths.

According to one configuration, each user is preassigned a particular wavelength, and all data addressed to that user is fed over that wavelength. In this case, a wavelength filter is provided associated with each receiver, so that each user receives only the information modulated onto his wavelength. According to another configuration, different services are assigned unique wavelengths. If a WDM element is provided at the remote node, no filtering element is required at the optical network unit (ONU). On the other hand, if a passive splitter is provided at the remote node, all the wavelengths transmitted to the users and defined service or services could be separated by tunable or passive filters at the ONU. Alternatively, different service groups could be provided according to their wavelengths. In this case, different services in each group could be combined and modulated onto the one wavelength.

However, known WDM systems typically include multiplexer and demultiplexer units which permit only a fixed number of optical channels to be used in the optical system. In order to expand such systems to include additional optical channels or wavelengths so as to add more users or services, additional multiplexers and corresponding demultiplexers must be added to the system, which is very expensive.

One solution to this problem was proposed by Alexander et al., in U.S. Pat. No. 5,557,439. This patent proposes an expandable wavelength division multiplexed optical communications system including an optical multiplexer module with N+x inputs, where N is the number of source lasers and corresponding optical signal channels, and x is the number of supplemental input ports to which no source laser is coupled. As additional channels are required, a new source laser with a corresponding optical signal channel not yet in use can be coupled to one of the supplemental input ports. However, such a system, which includes more channels than required, results in wasted channels and higher cost at start up, when fewer channels are needed.

Access networks differ from other broadband systems in that the bandwidth requirements for data transmission from customer to central office (upstream) may be different or much less than that for downstream transmission (from central office to customer). Different services can be provided with their assigned wavelengths. In this case, the number of required wavelength channels for downstream can be less than for upstream, where each customer is assigned his own unique wavelength. Thus, it is very important for access systems to have a flexible way to add additional wavelengths in response to demand.

At present, bulk or integrated optical grating-based demultiplexers are used in WDM systems in order to perform channel demultiplexing. These components can support at least 20–32 wavelengths. However, the component is very costly, the price per wavelength channel being in the range of $700–$1500. For transmission networks based on WDM technology, this factor is less important, since a main WDM advantage is to provide more capacity through each fiber. In access systems, on the other hand, the advantage of the WDM is the aggregation of services, service providers, different protocols on a single network, as well as providing additional capacity. It is clear that it is very important to add more wavelengths only according to demand, in order to decrease investment and to achieve a linear network roll-out, in which a network evolves gradually by adding the same unit each time when adding more services (wavelengths), service providers, etc.

In order to add information or drop signals, add and drop filters are known. In modern WDM systems, these add and drop filters are optically based, and signals on different wavelengths can be added or dropped. One example of an optical add and drop filter includes a pair of fibers connected at two points along their length, and a pair of identical Bragg gratings resonant at an identical wavelength, one of the Bragg gratings being disposed in each of the fibers between the two connection points. These systems are used today to permit communication between a plurality of remote nodes and a central office, without one interfering with the other. In this system, each remote node has its own assigned wavelengths for receiving and transmitting, which can be the same or can be different. Data for all remote nodes is transmitted over the fiber, each on its own wavelength. When data at the wavelength of a particular location is received, its first Bragg grating reflects that wavelength (it is dropped) and the output is received in the remote node. When the remote node wishes to send a communication, its data is overlaid on the same wavelength, and added to the system through the second Bragg grating.

There are also known systems for transmitting data over a single fiber in two directions. In order to permit such transmission without interference between the two signals, a loop is formed in the fiber and a so-called fiberoptic circulator is inserted between two points along the fiber. Signals traveling in one direction pass directly through the circulator, while signals traveling in the opposite direction are diverted around the loop.

Accordingly, there is a long felt need for a relatively inexpensive expandable multiplexer and it would be very desirable to have such a multiplexer which can be expanded several times in a modular fashion, particularly for use in access networks,

SUMMARY OF THE INVENTION

According to the present invention, there is provided an expandable multiplexer for adding additional channels per fiber in an optical communication system, the multiplexer including a wavelength multiplexer including at least two multiplexer input ports for combining a plurality of input wavelengths onto at least one multiplexer output port, and at least one wavelength filter including at least two filter input ports for combining at least two selected wavelengths onto at least one filter output port coupled to one of the multiplexer input ports.

According to one embodiment of the invention, the wavelength multiplexer includes an Arrayed Waveguide Grating (AWG) multiplexer/demultiplexer having a predefined free space range, and the at least one wavelength filter includes a narrow band wavelength division multiplexer (WDM) filter located at a first input port of the AWG multiplexer for coupling wavelengths separated by the free space range entering the AWG multiplexer.

According to an alternative embodiment of the invention, the wavelength multiplexer includes at least one add and drop multiplexer including two fibers coupled at two points, and the first wavelength filter includes a pair of identical Bragg gratings resonant at a unique identical wavelength for adding and dropping the unique wavelength, each Bragg grating disposed in one fiber of the add and drop multiplexer between the two points.

There is further provided according to the invention an optical communication system including a first expandable multiplexer including a first wavelength multiplexer including at least two multiplexer input ports for combining a plurality of input wavelengths onto at least one multiplexer output port, and at least one wavelength filter including at least two filter input ports for combining at least two selected wavelengths onto at least one filter output port coupled to one of the multiplexer input ports; and a second expandable multiplexer coupled for fiberoptic communication to the first expandable multiplexer including a second wavelength multiplexer including at least one multiplexer input port for splitting a plurality of output wavelengths onto at least two multiplexer output ports, and at least one wavelength filter including a filter input port for splitting at least two selected wavelengths from one of the multiplexer output ports onto at least two filter output ports.

There is also provided according to the invention a method of expanding an optical communication system including the steps of optically coupling a first and second expandable multiplexer, as described above, for optical communication over a plurality of wavelengths across at least one fiber, and adding at least one wavelength filter for combining at least one additional wavelength onto an input port of the first expandable multiplexer and at least one wavelength filter for splitting the at least one additional wavelength from an output port of the second expandable multiplexer.

BRIEF DESCRIPTION OF THE DRAWINGS

The present invention will be further understood and appreciated from the following detailed description taken in conjunction ith the drawings in which.

DETAILED DESCRIPTION

The present invention relates to an expandable multiplexer/demultiplexer for use in optical communication systems, particularly in access systems. The expandable multiplexer/demultiplexer is based on the use of a wavelength multiplexer for combining and splitting input wavelengths, and at least one wavelength filter for combining or splitting at least two selected wavelengths onto one input/output port of the wavelength multiplexer. When it is desired to expand the multiplexer, additional wavelength filters can be added, one at a time, to the wavelength multiplexer to permit the use of additional channels without replacing the existing system. It will be appreciated that each multiplexer is also a demultiplexer, and each filter both combines and splits wavelengths, depending upon the direction of travel of the signals. Therefore, for ease of description, the present invention will be described with relation to a multiplexer with a combining filter coupled to a multiplexer input port, although the same combination also acts as a demultiplexer with a splitting filter coupled to a demultiplexer output port in the mirror image orientation.

Figure 1:
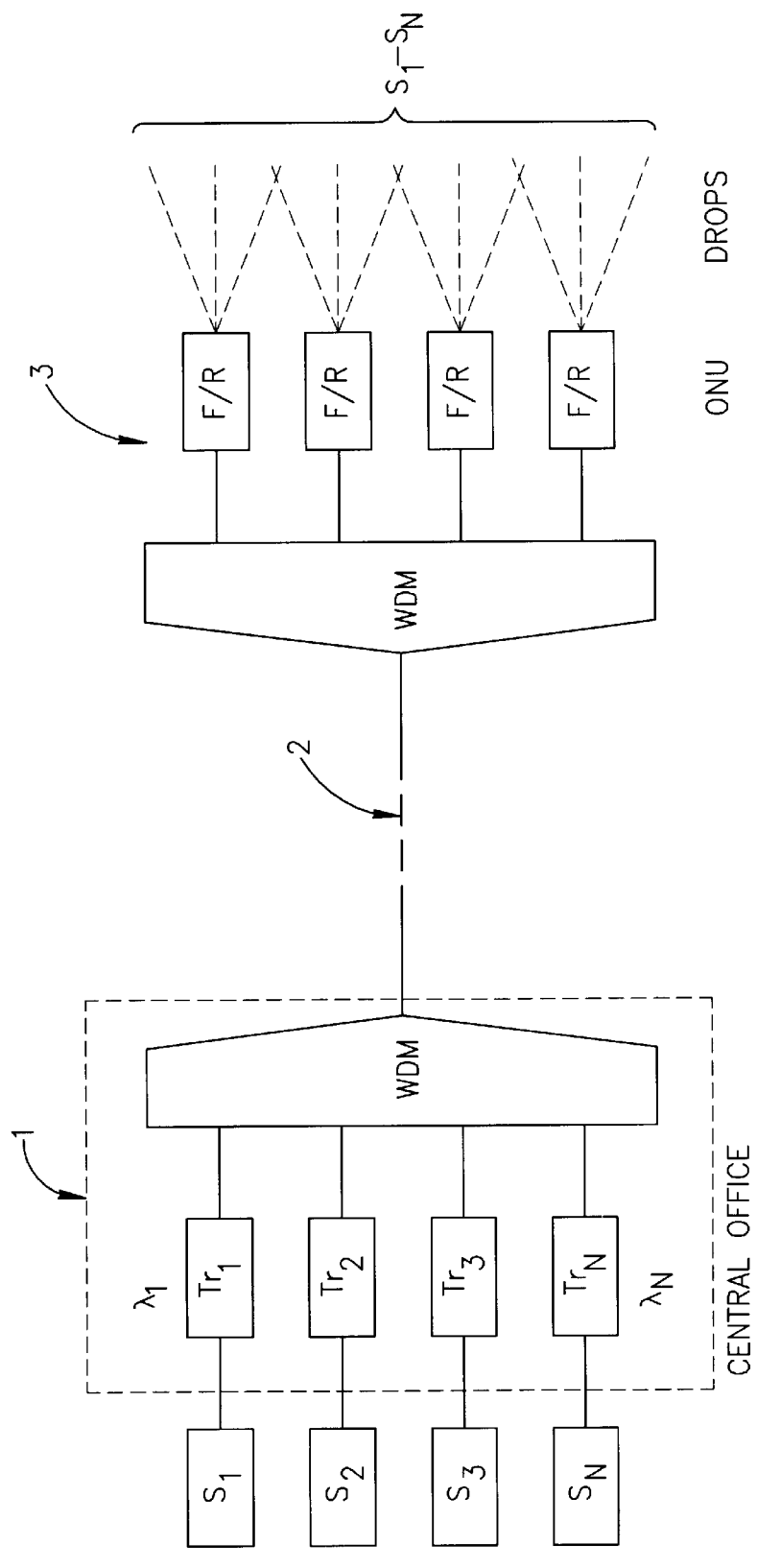
FIG. 1 is a schematic illustration of a typical WDM structure for conventional broadband systems.
Figure 2:
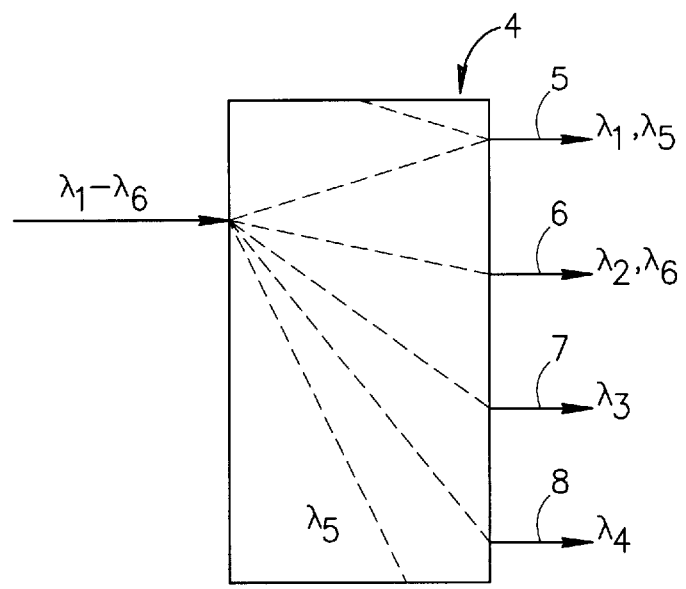
FIG. 2 is a schematic illustration of the function of a conventional arrayed waveguide multiplexer.

According to one embodiment of the invention, the wavelength multiplexer includes a conventional Arrayed Waveguide Grating (AWG) Multi/Demultiplexer. One of the properties of AWG multiplexers is periodicity, namely, that higher wavelengths, separated from the lower wavelengths by the free space range of the multiplexer, wrap around and are overlaid on a lower port, as shown in FIG. 2, rather than being dropped or lost, as in other conventional multiplexers.

As can be seen, in a four channel AWG 4, each of the first four wavelengths is provided to one of the four channels 5,6,7,8. When a fifth wavelength is added which is separated from the first wavelength by the free space range of the multiplexer, it is overlaid on the first channel 5; when a sixth wavelength is added which is separated from the second wavelength by the free space range of the multiplexer, it is overlaid on the second channel 6; and so on. The number of wavelengths which can be overlaid on each channel in conventional AWG multiplexers depends on the free space range. When an amplifier is included in the system, the range is limited to 40 nm, so five or six channels can be overlaid on each channel. Without an amplifier, there is no such limit.

At present, this capacity is utilized only to increase the strength of the original signals transmitted over the AWG multiplexer. In other words, the fifth wavelength includes the same signal as the first wavelength, so that the energy of each signal is increased.

Figure 3:
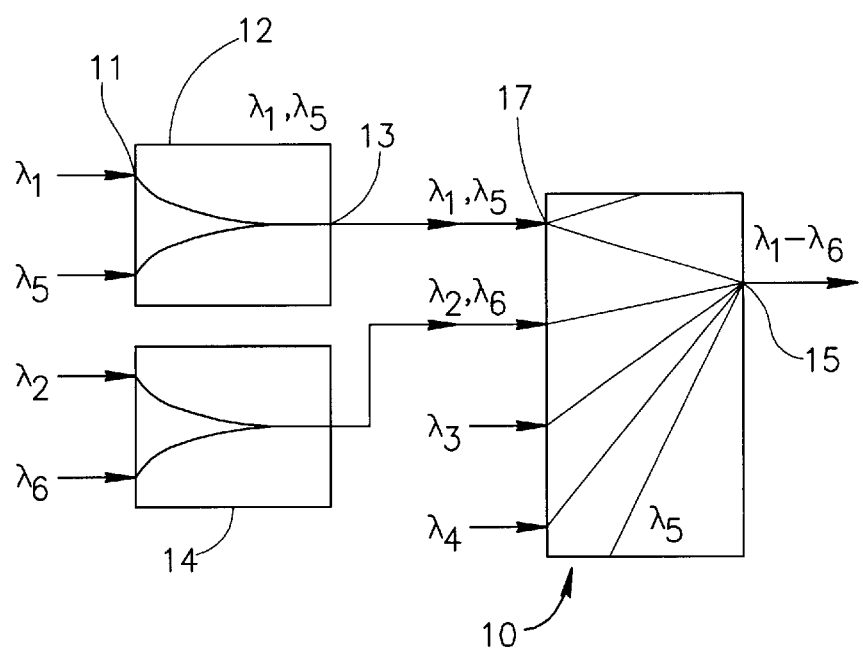
FIG. 3 is a schematic illustration of an expandable multiplexer constructed and operative in accordance with one embodiment of the present invention.

Referring now to FIG. 3, there is shown a schematic illustration of an expandable multiplexer constructed and operative in accordance with one embodiment of the present invention and including an AWG WDM 10, here illustrated as a four channel AWG WDM. AWG WDM 10 can be any conventional AWG WDM, such as those commercially available from NEL, Japan, and Photonic Integration Research, Inc., USA.

A narrow band WDM filter 12 is utilized to combine onto a single filter output port 13, a selected number of wavelengths carrying different signals, each on its own filter input port 11, for introduction into a single multiplexer input port 17 of the AWG WDM, here the first I/O port, for multiplexing onto the multiplexer output port 15. In the simplest embodiment of the invention, illustrated here, a narrow band filter for combining or separating two wavelengths is utilized. Thus, a four channel AWG can carry up to eight wavelengths. Alternatively, a narrowband filter for four wavelengths or any other selected number of wavelengths can be utilized. Narrow band WDM filter 12 is a conventional narrow band splitter, such as those commercially available from Photonic Integration Research, Inc., USA, and DiCon Fiberoptics, Inc., USA, having a wavelength spacing equal to the difference between $\lambda_1$ and $\lambda_2$, and a free space range equal to the difference between $\lambda_1$ and $\lambda_5$.

When it is desired to transmit signals over another wavelength to the network, a second narrow band WDM filter 14 is added. In the embodiment of FIG. 3, narrow band WDM filter 14 is also a two wavelength splitter, and serves to combine wavelengths $\lambda_2$ and $\lambda_6$ onto a second input port of AWG WDM 10.

Figure 4:
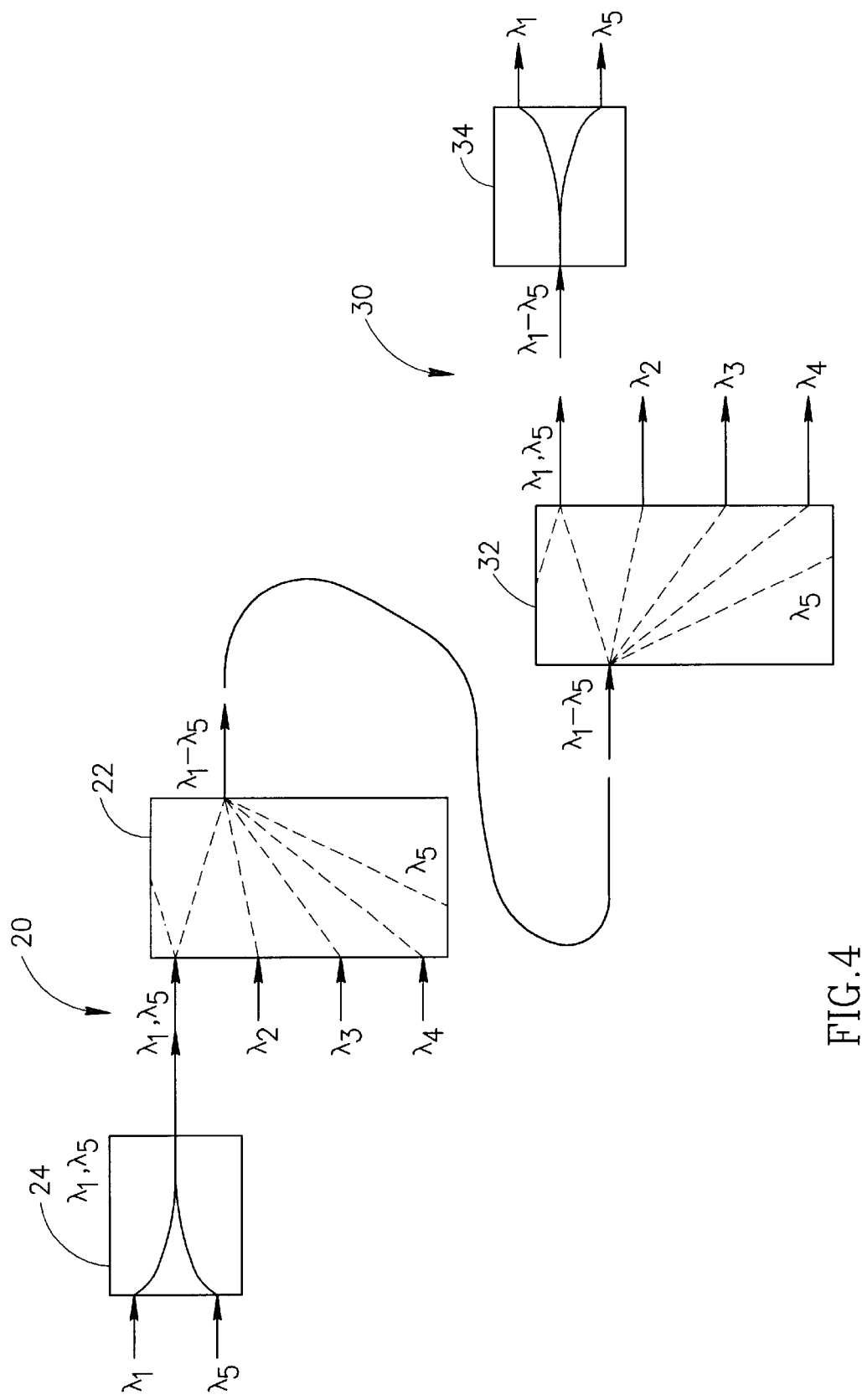
FIG. 4 is a schematic illustration of a fiber network including two expandable multiplexers as shown in FIG. 3.

Referring now to FIG. 4, there is shown a schematic illustration of a fiber network forming part of an optical communication system and including two expandable multiplexers as illustrated in FIG. 3. The central office includes an expandable multiplexer 20, which is substantially identical to that illustrated in FIG. 3. At expandable multiplexer 20, signals destined for different customers are modulated onto their assigned wavelengths and multiplexed onto the shared fiber by AWG WDM 22. As more wavelengths are required, one or more narrow band WDM filters 24 are added so as to combine the added wavelengths on a defined port.

At the customer end, a second expandable multiplexer 30 is provided, here acting as a demultiplexer. Demultiplexer 30 includes an AWG WDM 32 and the necessary number of narrow band wavelength WDM filters 34, each corresponding to a narrow band WDM filter 24 in the central office, at the respective output ports of AWG WDM 32. AWG WDM 32 separates the signals and narrow band WDM filter 24 splits those which were combined on the same AWG WDM output port. The signals are then distributed to each customer (or group of customers). Each customer receives only his assigned wavelength, thus preserving security. Wavelength filtering is required at the optical network unit only when a group configuration of customers is utilized.

When more than eight wavelengths are required, preferably a second AWG WDM is added to the system. This permits continued use of the network as already established, without taking apart any elements. Alternatively, it is possible to remove one of the two wavelength narrow band WDM filters and replace it with a narrow band WDM filter having the capacity to combine a greater number of wavelengths onto a single output signal.

Figure 5:
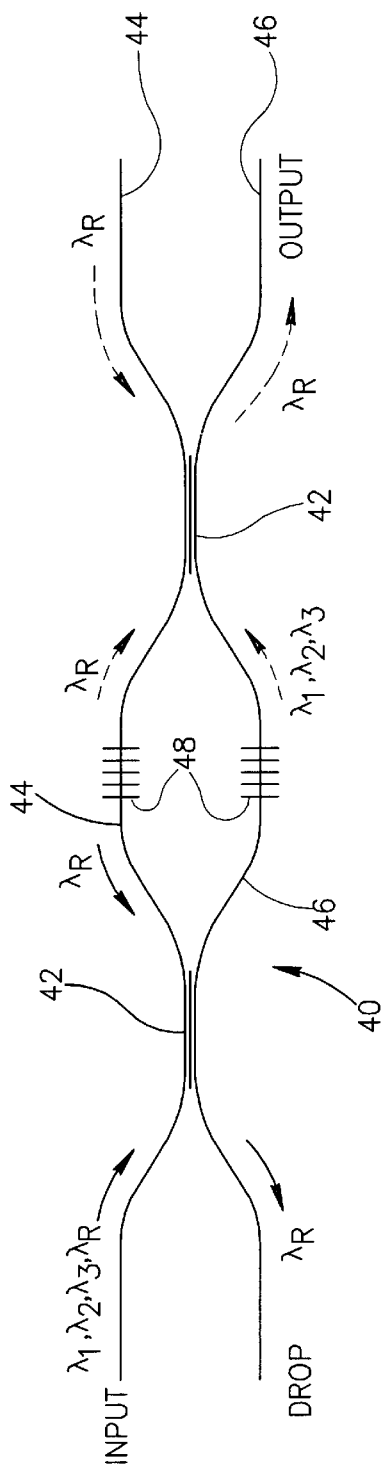
FIG. 5 is a schematic illustration of an expandable multiplexer constructed and operative in accordance with an alternative embodiment of the present invention.

Referring now to FIG. 5, there is shown a schematic illustration of an expandable multiplexer constructed and operative in accordance with an alternative embodiment of the present invention. The expandable multiplexer of this embodiment includes at least one add and drop multiplexer 40. Add and drop multiplexer 40 includes two fibers 44, 46, coupled at two points 42 and 42', and a wavelength filter including a pair of identical Bragg gratings 48 resonant at an identical wavelength, each disposed in one fiber 44 or 46. It is a particular feature of this embodiment of the invention that the basic unit is an add and drop multiplexer for a single wavelength. Any number of wavelengths, $\lambda_1, \lambda_2, \lambda_3 \ldots \lambda_R$ can be input to the multiplexer 42. One wavelength, $\lambda_R$, will be reflected by the Bragg gratings filter 48 and dropped for receipt by a first customer. The remaining wavelengths, $\lambda_1, \lambda_2, \lambda_3 \ldots$ will be transmitted through filter 48 and on through fiber 44. When the first customer wants to transmit data, he can add it on $\lambda_R$ on fiber 46, and it will be reflected by filter 48 to fiber 44, together with the remaining wavelengths. Preferably, coupler 42 is adapted to prevent $\lambda_R$ from returning to the input fiber, and wavelengths $\lambda_1, \lambda_2, \lambda_3$, from entering fiber 46.

Figure 6:
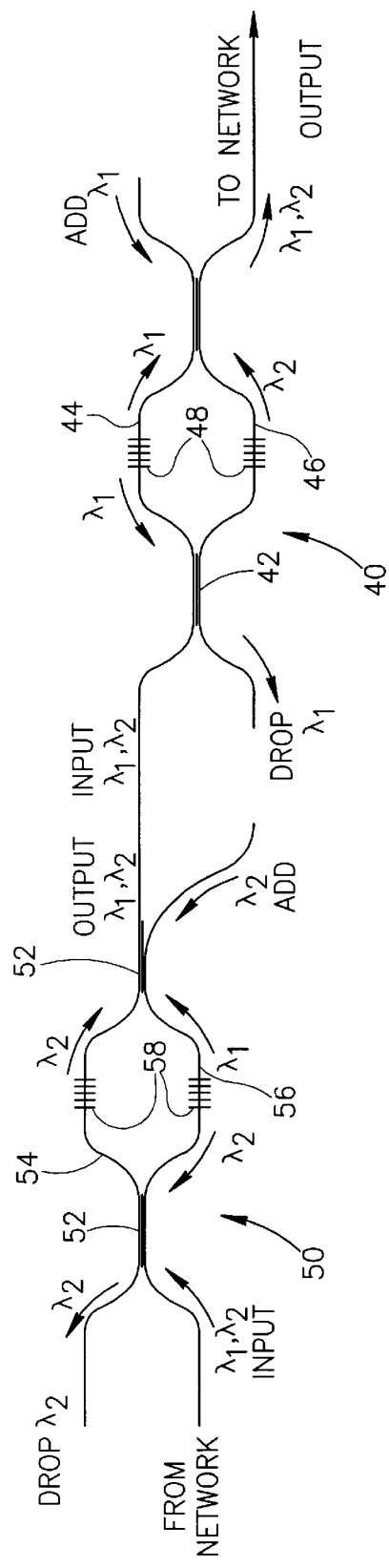
FIG. 6 is a schematic illustration of one embodiment of a communications network including the expandable multiplexer of FIG. 5.

When a second customer is to be added, it is merely necessary to add another add and drop multiplexer 50, as shown in FIG. 6. Add and drop multiplexer 50 is also a wavelength filter including a pair of identical Bragg gratings 58 resonant at an identical wavelength $\lambda_2$, different from that of Bragg gratings 48. One fiber 44, the input of add and drop multiplexer 40, is coupled, as by a fusing splice, to fiber 56, the output of add and drop multiplexer 50. Fiber 56 of add and drop multiplexer 50 serves as the add fiber for adding second wavelength $\lambda_2$. Fiber 54 of add and drop multiplexer 50 serves as the drop fiber for wavelength $\lambda_2$. It is a particular feature of this embodiment of the invention that adding multiplexer 50 on the upstream end of multiplexer 40 permits continued use of multiplexer 40 without interruption, even while adding another user and wavelength.

Operation of this embodiment is substantially as described with reference to FIG. 5. Data from the network is input into the system, here acting as a multiplexer, on first wavelength $\lambda_1$ and second wavelength $\lambda_2$. Wavelength $\lambda_2$ is reflected and dropped from multiplexer 50 and received by the second customer over the drop fiber 54. The second customer can transmit his data by adding it on the same wavelength $\lambda_2$ on the add fiber 56. This data passes through the first add and drop multiplexer 40 to its destination.

Data for the first customer passes through the second add and drop multiplexer 50 and is input into first add and drop multiplexer 40. Wavelength $\lambda_1$ is reflected and dropped from multiplexer 40 on drop fiber 46 and received by the first customer. The first customer can transmit his data by adding it on the same wavelength $\lambda_1$ on add fiber 44.

In the same way, a number of customers can quickly and easily be added to the communication system, each having his own wavelength for privacy and reliable transmission. The number of customers is limited by the insertions losses. Approximately 32 wavelengths can be utilized in a single such communication system, when it includes an optical amplifier.

It will be appreciated that this embodiment permits communication between the system and the network in both directions over a single fiber. Signals coming in the opposite direction to those indicated will merely cause the multiplexer to function as a demultiplexer, with the add fibers becoming drop fibers, and the drop fibers becoming the corresponding add fibers.

Figure 7:
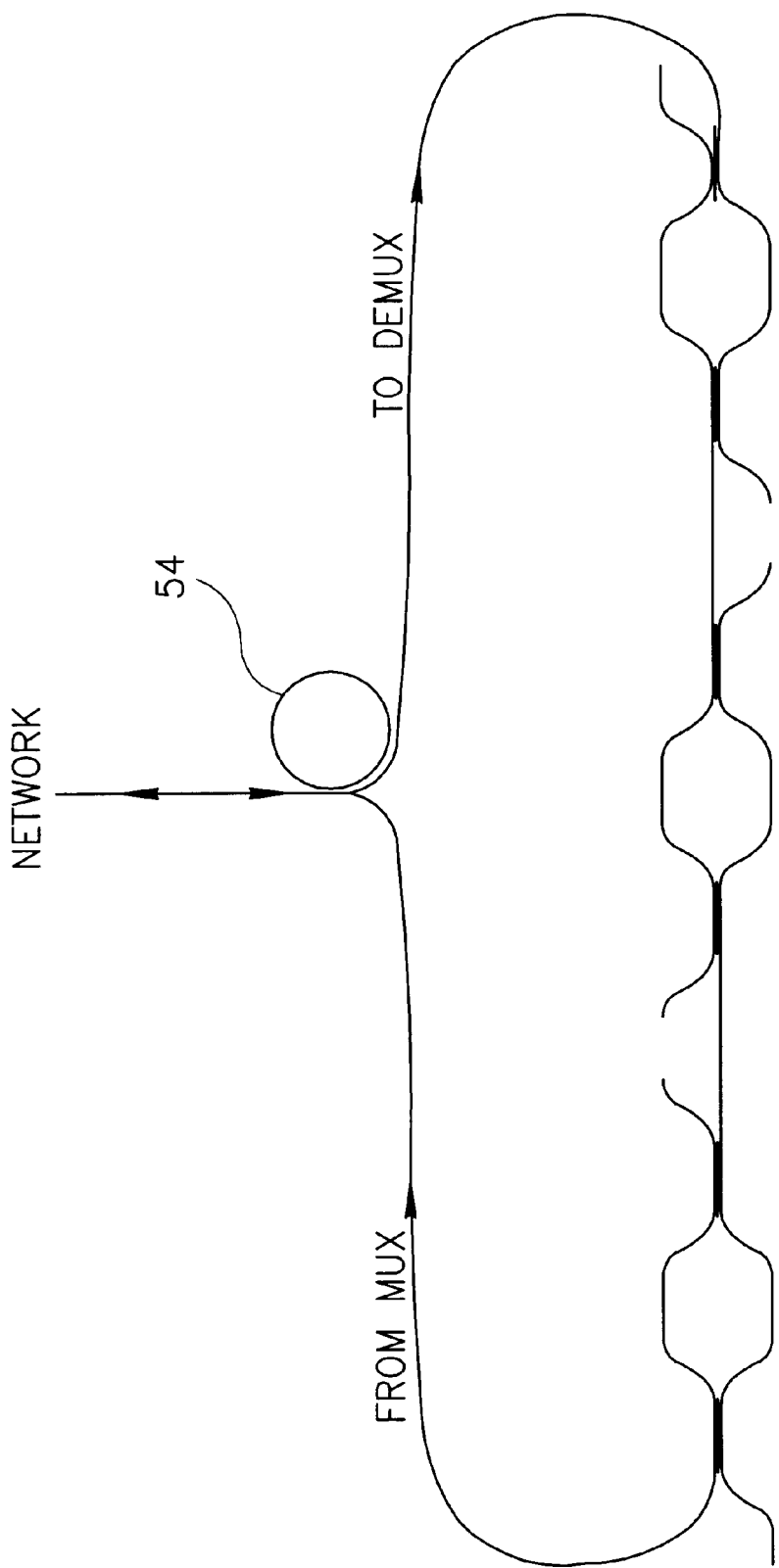
FIG. 7 is a schematic illustration of another embodiment of a communications network according to the invention.

However, when this communications system is arranged in a loop, which is desirable for redundancy, communication is permitted in only one direction around the loop. Thus, in conventional loop communications systems, it is necessary to utilize two loops, one for upstream and one for downstream. According to the present invention, however, it is possible to permit communication both downstream and upstream in a loop system over a single loop. This can be accomplished, as shown in FIG. 7 by coupling a fiberoptic circulator 54 between the fibers in the loop, thereby providing through transmission of data in one direction, and diversion to data transmitted in the other direction. In this case, should there be a failure of a fiber somewhere along the loop, all communications can be routed in the other direction, without interrupting service.

It will be appreciated that the invention is not limited to what has been described hereinabove merely by way of example. Rather, the invention is limited solely by the claims, when properly construed which follow.

What is claimed is:

1. An expandable multiplexer for adding additional channels per fiber in an optical communication system, the multiplexer comprising:
   a wavelength multiplexer comprising an Arrayed Waveguide Grating (AWG) multiplexer/demultiplexer having a predefined free space range and including at least two multiplexer input ports for combining a plurality of input wavelengths onto at least one multiplexer output port; and
   at least one wavelength filter including at least two filter input ports for combining at least two selected wavelengths onto at least one filter output port coupled to one of said multiplexer input ports.

2. The expandable multiplexer of claim 1, wherein:
   said wavelength multiplexer includes an Arrayed Waveguide Grating (AWG) multiplexer/demultiplexer having a predefined free space range; and
   said at least one wavelength filter includes a narrow band wavelength division multiplexer (WDM) filter located at a first input port of said AWG multiplexer for coupling wavelengths separated by said free space range entering said AWG multiplexer.

3. The expandable multiplexer of claim 2, wherein said wavelength multiplexer is a four channel multiplexer, and further including between one and three additional narrow band wavelength division multiplexer filters, each coupled to a different multiplexer input port of said AWG multiplexer, each for coupling two wavelengths separated by said free space range entering said port.

4. An expandable multiplexer for adding additional channels per fiber in an optical communication system, the multiplexer comprising:
   a wavelength multiplexer including at least two multiplexer input ports for combining a plurality of input wavelengths onto at least one multiplexer output port; and
   at least one wavelength filter including at least two filter input ports for combining at least two selected wavelengths onto at least one filter output port coupled to one of said multiplexer input ports, wherein:
   said wavelength multiplexer includes at least one add and drop multiplexer including two fibers coupled at two points; and
   said first wavelength filter includes a pair of identical Bragg gratings resonant at a unique identical wavelength, each said Bragg grating disposed in one fiber of said add and drop multiplexer between said two points for adding and dropping said unique wavelength.

5. A communications system comprising:
   a first expandable multiplexer including:
      a first wavelength multiplexer comprising an Arrayed Waveguide Grating (AWG) multiplexer/demultiplexer having a predefined free space range and including at least two multiplexer input ports for combining a plurality of input wavelengths onto at least one multiplexer output port; and
      at least one wavelength filter including at least two filter input ports for combining at least two selected wavelengths onto at least one filter output port coupled to one of said multiplexer input ports; and
   a second expandable multiplexer coupled for fiberoptic communication to said first expandable multiplexer including:
      a second wavelength multiplexer comprising an Arrayed Waveguide Grating (AWG) multiplexer/demultiplexer and including at least one multiplexer input port for splitting a plurality of output wavelengths onto at least two multiplexer output ports; and
      at least one wavelength filter including a filter input port for splitting at least two selected wavelengths from one of said multiplexer output ports onto at least two filter output ports.

6. The communications system of claim 5, wherein:
   said first wavelength multiplexer includes an Arrayed Waveguide Grating (AWG) multiplexer/demultiplexer having a predefined free space range;
   said at least one wavelength filter in said first expandable multiplexer includes a narrow band wavelength division multiplexer (WDM) filter, located at a first input port of said first AWG multiplexer for coupling wavelengths separated by said free space range entering said first AWG multiplexer;
   said second wavelength multiplexer includes an Arrayed Waveguide Grating (AWG) multiplexer/demultiplexer having said predefined free space range; and
   said at least one wavelength filter in said second expandable multiplexer includes a narrow band wavelength division multiplexer (WDM) filter, located at a first output port of said second AWG multiplexer for splitting the wavelengths leaving said second AWG multiplexer.

7. The communications system of claim 6, further including:
   up to three wavelength filters coupled to different input ports of said first AWG multiplexer, each for combining two wavelengths separated by said free space range onto said different input port of said first AWG multiplexer; and
   up to three wavelength filters located at different output ports of said second AWG multiplexer, each for splitting two wavelengths leaving said different output port of second AWG multiplexer corresponding to said combined wavelengths.

8. A communications system comprising:
   a first expandable multiplexer including:
      a first wavelength multiplexer including at least two multiplexer input ports for combining a plurality of input wavelengths onto at least one multiplexer output port; and
      at least one wavelength filter including at least two filter input ports for combining at least two selected wavelengths onto at least one filter output port coupled to one of said multiplexer input ports; and a second expandable multiplexer coupled for fiberoptic communication to said first expandable multiplexer including:
  a second wavelength multiplexer including at least one multiplexer input port for splitting a plurality of output wavelengths onto at least two multiplexer output ports; and
  at least one wavelength filter including a filter input port for splitting at least two selected wavelengths from one of said multiplexer output ports onto at least two filter output ports, wherein:
said first wavelength multiplexer includes a first add and drop multiplexer including two fibers coupled at two points, and said first wavelength filter includes a pair of identical Bragg gratings resonant at a first unique identical wavelength, each said Bragg grating disposed in one fiber of said add and drop multiplexer between said two points for adding and dropping said first unique wavelength; and
said second wavelength multiplexer includes a second add and drop multiplexer including two fibers coupled at two points, and said second wavelength filter includes a pair of identical Bragg gratings resonant at a second unique identical wavelength, each said Bragg grating disposed in one fiber of said add and drop multiplexer between said two points for adding and dropping said second unique wavelength;
said first wavelength multiplexer being coupled to said second wavelength multiplexer.

9. The communications system of claim 8, wherein said expandable multiplexer includes a plurality of add and drop multiplexers coupled to one another, each said add and drop multiplexer including two fibers coupled at two points, and an associated wavelength filter including a pair of identical Bragg gratings resonant at a unique identical wavelength, for adding and dropping said unique wavelength, each said Bragg grating disposed in one fiber of said add and drop multiplexer between said two points.

10. The communications system of claim 9, further comprising a fiberoptic circulator coupling said multiplexer input and said multiplexer output in a loop.

11. A method of expanding an optical communication system, the method comprising the steps of:
  optically coupling a first and second expandable multiplexer, each including a wavelength multiplexer comprising an Arrayed Waveguide Grating (AWG) multiplexer/demultiplexer having a predefined free space range and having at least two input ports for combining a plurality of input wavelengths onto at least one multiplexer output port, and a wavelength filter having at least two filter input ports for combining at least two selected wavelengths onto at least one filter output port coupled to at least one of said multiplexer input ports, for optical communication over a plurality of wavelengths across at least one fiber; and
  adding at least one wavelength filter for combining at least one additional wavelength onto an input port of said first expandable multiplexer and at least one wavelength filter for splitting said at least one additional wavelength from an output port of said second expandable multiplexer.

12. The method of claim 11, wherein said first and second expandable multiplexers each includes an Arrayed Waveguide Grating (AWG) multiplexer/demultiplexer having a predefined free space range, and wherein said step of adding includes:
  inserting two corresponding narrow band wavelength division multiplexer (WDM) filters, one located at a first input port of said first AWG multiplexer for combining wavelengths separated by said free space range entering said first AWG multiplexer, and one located at a first output port of said second AWG multiplexer for splitting said combined wavelengths leaving said second AWG multiplexer.

13. The method of claim 12, further corrprising the step of inserting a third narrow band wavelength division multiplexer (WDM) filter at a second input port of said first AWG multiplexer for coupling two different wavelengths separated by said free space range entering said first AWG multiplexer onto a single signal; and inserting a fourth narrow band wavelength division multiplexer filter at a second output port of the second AWG multiplexer for splitting said combined different wavelengths leaving said second AWG multiplexer.

14. A method of expanding an optical communication system, the method comprising the steps of:
  optically coupling a first and second expandable multiplexer, each according to claim 1, for optical communication over a plurality of wavelengths across at least one fiber; and
  adding at least one wavelength filter for combining at least one additional wavelength onto an input port of said first expandable multiplexer and at least one wavelength filter for splitting said at least one additional wavelength from an output port of said second expandable multiplexer, wherein said expandable multiplexer includes an add and drop multiplexer, and the wavelength filter includes a pair of identical Bragg gratings resonant at a unique identical wavelength, associated with the add and drop multiplexer, wherein the step of adding includes:
  connecting to said first add and drop multiplexer another add and drop multiplexer and associated pair of identical Bragg gratings resonant at a different identical wavelength.

15. The method of claim 14, wherein said step of adding includes adding at least one wavelength to said expandable multiplexer without disturbing any existing wavelength.

16. The method of claim 14, wherein said step of adding includes adding another add and drop multiplexer coupled to said add and drop multiplexer.

* * * * *